(12) United States Patent
Veeramani et al.

(10) Patent No.: US 12,382,267 B2
(45) Date of Patent: *Aug. 5, 2025

(54) TECHNOLOGIES FOR STREAMING DEVICE ROLE REVERSAL

(71) Applicant: Intel Corporation, Santa Clara, CA (US)

(72) Inventors: Karthik Veeramani, Hillsboro, OR (US); Rajneesh Chowdhury, Portland, OR (US); Ujwal Paidipathi, Beaverton, OR (US); Brian E. Rogers, Aloha, OR (US); Aslam Padath Peedikayil Abdul Rahim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,415

(22) Filed: May 29, 2024

(65) Prior Publication Data

US 2024/0406240 A1    Dec. 5, 2024

Related U.S. Application Data

(63) Continuation of application No. 17/872,788, filed on Jul. 25, 2022, now Pat. No. 12,041,109, which is a
(Continued)

(51) Int. Cl.
*H04W 4/80* (2018.01)
*H04L 65/61* (2022.01)
(Continued)

(52) U.S. Cl.
CPC ............... *H04W 4/80* (2018.02); *H04L 65/61* (2022.05); *H04L 65/75* (2022.05); *H04L 65/756* (2022.05)

(58) Field of Classification Search
CPC ... H04L 63/0428; H04L 65/60; H04L 67/104; H04L 67/1063; H04L 67/1091;
(Continued)

(56) References Cited

U.S. PATENT DOCUMENTS

| | | |
|---|---|---|
| 5,706,290 A | 1/1998 | Shaw |
| 5,815,194 A | 9/1998 | Ueda |

(Continued)

FOREIGN PATENT DOCUMENTS

| | | |
|---|---|---|
| AU | 2007292453 A1 | 3/2008 |
| CA | 2658721 A1 | 3/2008 |

(Continued)

OTHER PUBLICATIONS

International Search Report and Written Opinion issued by the International Bureau in corresponding International Patent Application No. PCT/US2016/063574 dated Mar. 13, 2017, 10 pages.
(Continued)

*Primary Examiner* — Eric Nowlin
(74) *Attorney, Agent, or Firm* — Hanley, Flight & Zimmerman, LLC

(57) ABSTRACT

Technologies for streaming device role reversal include a source computing device and a destination computing device coupled via a communication channel. The source computing device and destination computing device are each configured to support role reversal. In other words, the source computing device and the destination computing device are each capable of switching between receiving and transmitting digital media content over the established communication channel. The source computing device is configured to initiate the role reversal, pause transmit functionality of the source computing device, and enable receive functionality of the source computing device. The destination computing device is configured to receive a role rever-
(Continued)

sal indication from the source computing device, locally process the content, transmit a content stream to the source computing device, and display the content stream on an output device of the source computing device. Other embodiments are described and claimed herein.

20 Claims, 7 Drawing Sheets

Related U.S. Application Data continuation of application No. 16/944,703, filed on Jul. 31, 2020, now Pat. No. 11,405,443, which is a continuation of application No. 16/150,264, filed on Oct. 2, 2018, now Pat. No. 10,764,346, which is a continuation of application No. 14/998,311, filed on Dec. 26, 2015, now Pat. No. 10,091,264.

(51) Int. Cl.
*H04L 65/75* (2022.01)
*H04L 65/756* (2022.01)

(58) Field of Classification Search
CPC .............. H04L 65/4069; H04L 65/4076; H04L 65/4084; H04N 21/632; H04N 21/47202
See application file for complete search history.

(56) References Cited

U.S. PATENT DOCUMENTS

| | | | |
|---|---|---|---|
| 6,912,574 B2 | 6/2005 | Scifres | |
| 7,062,570 B2 | 6/2006 | Hong | |
| 7,113,990 B2 | 9/2006 | Scifres | |
| 7,117,521 B2 | 10/2006 | Puthiyedath | |
| 7,142,509 B1 | 11/2006 | Rovner | |
| 7,177,945 B2 | 2/2007 | Hong | |
| 7,194,520 B1 | 3/2007 | Beard | |
| 7,228,350 B2 | 6/2007 | Hong | |
| 7,237,254 B1 | 6/2007 | Omoigui | |
| 7,274,661 B2 | 9/2007 | Harrell | |
| 7,292,571 B2 | 11/2007 | Brown | |
| 7,336,784 B2 | 2/2008 | Zuili | |
| 7,478,432 B2 | 1/2009 | Echizen | |
| 7,558,879 B2 | 7/2009 | Nishio | |
| 7,636,549 B2* | 12/2009 | Ma | G16H 40/20 455/411 |
| 7,647,616 B2 | 1/2010 | Puthiyedath | |
| 7,788,394 B2 | 8/2010 | Gregotski | |
| 7,836,223 B2 | 11/2010 | Butcher | |
| 7,921,222 B2 | 4/2011 | Courtemanche | |
| 7,953,883 B2 | 5/2011 | Thomas | |
| 7,987,490 B2 | 7/2011 | Ansari | |
| 8,116,258 B2 | 2/2012 | Perlman | |
| 8,117,323 B2 | 2/2012 | Courtemanche | |
| 8,131,673 B2 | 3/2012 | Chavez | |
| 8,132,218 B2 | 3/2012 | Six | |
| 8,156,236 B2 | 4/2012 | Costanzo | |
| 8,191,163 B1 | 5/2012 | Sun | |
| 8,255,552 B2 | 8/2012 | Witt | |
| 8,266,315 B2 | 9/2012 | Van Oldenborgh | |
| 8,351,437 B2* | 1/2013 | Haartsen | H04N 21/43637 370/535 |
| 8,370,649 B2 | 2/2013 | Sherer | |
| 8,384,527 B2* | 2/2013 | Irwin | G04G 13/02 340/539.11 |
| 8,392,594 B2 | 3/2013 | Georgis | |
| 8,452,885 B2 | 5/2013 | Sherer | |
| 8,527,649 B2 | 9/2013 | Wexler | |
| 8,543,665 B2 | 9/2013 | Ansari | |
| 8,549,573 B2 | 10/2013 | Velusamy | |
| 8,561,115 B2 | 10/2013 | Hattori | |
| 8,621,650 B2 | 12/2013 | Cakulev | |
| 8,631,144 B2 | 1/2014 | Lee | |
| 8,676,882 B2 | 3/2014 | Georgis | |
| 8,687,046 B2 | 4/2014 | Yu | |
| 8,707,375 B2 | 4/2014 | Hainline | |
| 8,750,796 B2* | 6/2014 | Claus | H04W 12/02 455/569.1 |
| 8,763,052 B2 | 6/2014 | Theberge | |
| 8,768,251 B2* | 7/2014 | Claus | H04W 12/50 455/41.1 |
| 8,788,076 B2 | 7/2014 | Eschholz et al. | |
| 8,799,480 B2 | 8/2014 | Kovvali | |
| 8,825,766 B2 | 9/2014 | Smith | |
| 8,832,290 B2 | 9/2014 | Li | |
| 8,908,103 B2 | 12/2014 | Kitazato | |
| 8,954,596 B2 | 2/2015 | Ronca | |
| 8,959,145 B2 | 2/2015 | Georgis | |
| 8,970,662 B2 | 3/2015 | Kerger | |
| 8,977,765 B1 | 3/2015 | Patel | |
| 9,009,337 B2 | 4/2015 | Ronca | |
| 9,049,338 B2 | 6/2015 | Witt | |
| 9,118,814 B2 | 8/2015 | Janardhan | |
| 9,148,478 B2 | 9/2015 | Cakulev | |
| 9,179,277 B2 | 11/2015 | Kerger | |
| 9,210,085 B2 | 12/2015 | Harrison | |
| 9,210,451 B2 | 12/2015 | Zhou | |
| 9,231,786 B2 | 1/2016 | Wu | |
| 9,276,665 B1 | 3/2016 | Johnson | |
| 9,294,580 B2 | 3/2016 | Morrison, III | |
| 9,374,420 B2 | 6/2016 | Burba | |
| 9,413,664 B1 | 8/2016 | Sun | |
| 9,420,347 B2 | 8/2016 | Khouzam | |
| 9,455,777 B1 | 9/2016 | Johnson | |
| 9,479,833 B2 | 10/2016 | Kitazato | |
| 9,563,716 B2 | 2/2017 | Narvaez | |
| 9,596,306 B2 | 3/2017 | Morrison, III | |
| 9,622,259 B2 | 4/2017 | Johnson | |
| 9,667,411 B2 | 5/2017 | Kumar | |
| 9,699,500 B2 | 7/2017 | Kafle | |
| 9,723,365 B2 | 8/2017 | Blanchard | |
| 9,729,627 B2 | 8/2017 | Zhang | |
| 9,819,715 B2 | 11/2017 | Scurtu | |
| 9,860,290 B2 | 1/2018 | Oyman | |
| 9,949,038 B2 | 4/2018 | Guindi | |
| 9,949,205 B2* | 4/2018 | Newham | H04R 1/1091 |
| 10,091,264 B2 | 10/2018 | Veeramani | |
| 10,244,468 B2* | 3/2019 | Newham | H04W 4/80 |
| 10,255,145 B2 | 4/2019 | Eschholz et al. | H04W 52/0206 |
| 10,271,091 B2 | 4/2019 | Robbins | |
| 10,419,545 B2 | 9/2019 | Marquardt | |
| 10,530,856 B2 | 1/2020 | Verma | |
| 10,764,346 B2 | 9/2020 | Veeramani | |
| 10,909,010 B2 | 2/2021 | Chandrasekaran | |
| 10,979,990 B2 | 4/2021 | Srivastava | |
| 11,191,024 B2* | 11/2021 | Lovich | H04L 41/0816 |
| 11,202,334 B2 | 12/2021 | Ouyang | |
| 11,368,775 B1 | 6/2022 | Prelogar et al. | |
| 11,405,443 B2 | 8/2022 | Veeramani et al. | |
| 11,451,906 B2* | 9/2022 | Tong | H04R 5/033 |
| 11,622,404 B2* | 4/2023 | Morris | H04W 4/06 370/329 |
| 11,711,586 B2 | 7/2023 | Wittke | |
| 11,937,041 B2* | 3/2024 | Chan | H04R 1/1041 |
| 12,003,911 B2* | 6/2024 | Graham | G06F 1/163 |
| 2002/0062372 A1 | 5/2002 | Hong | |
| 2003/0046032 A1 | 3/2003 | Puthiyedath | |
| 2003/0067872 A1 | 4/2003 | Harrell | |
| 2003/0154283 A1 | 8/2003 | Brown | |
| 2003/0225905 A1 | 12/2003 | Scifres | |
| 2004/0123125 A1 | 6/2004 | Zuili | |
| 2004/0143665 A1 | 7/2004 | Mace | |
| 2004/0221163 A1 | 11/2004 | Jorgensen | |
| 2005/0033832 A1 | 2/2005 | Hass | |
| 2005/0041679 A1 | 2/2005 | Weinstein | |
| 2005/0073968 A1 | 4/2005 | Perlman | |
| 2005/0226153 A1 | 10/2005 | Scifres | |
| 2005/0238000 A1 | 10/2005 | Pollock | |
| 2005/0240961 A1 | 10/2005 | Jerding | |
| 2006/0174160 A1 | 8/2006 | Kim | |
| 2006/0174289 A1 | 8/2006 | Theberge | |
| 2006/0235967 A1 | 10/2006 | Fritz | |

(56) References Cited

U.S. PATENT DOCUMENTS

| | | |
|---|---|---|
| 2006/0288391 A1 | 12/2006 | Puthiyedath |
| 2007/0101377 A1 | 5/2007 | Six |
| 2007/0136488 A1 | 6/2007 | Cho |
| 2007/0180512 A1 | 8/2007 | Chaudhuri |
| 2007/0198726 A1 | 8/2007 | Marco |
| 2007/0222779 A1 | 9/2007 | Fastert |
| 2007/0234385 A1 | 10/2007 | Bopardikar |
| 2007/0249286 A1* | 10/2007 | Ma .................. H04W 12/50 455/507 |
| 2007/0250880 A1 | 10/2007 | Hainline |
| 2008/0022006 A1 | 1/2008 | Van Oldenborgh |
| 2008/0059645 A1 | 3/2008 | Gregotski |
| 2008/0066181 A1 | 3/2008 | Haveson |
| 2008/0133538 A1 | 6/2008 | Chavez |
| 2008/0140853 A1 | 6/2008 | Harrison |
| 2008/0168523 A1 | 7/2008 | Ansari |
| 2008/0183794 A1 | 7/2008 | Georgis |
| 2008/0205291 A1 | 8/2008 | Li |
| 2008/0208985 A1 | 8/2008 | Georgis |
| 2008/0228934 A1 | 9/2008 | Eschholz et al. |
| 2008/0285626 A1* | 11/2008 | Claus ................ H04W 12/06 375/E1.033 |
| 2008/0287062 A1* | 11/2008 | Claus ................ H04W 12/50 455/41.2 |
| 2008/0298370 A1 | 12/2008 | Yoshimoto |
| 2009/0013095 A1 | 1/2009 | Butcher |
| 2009/0037517 A1 | 2/2009 | Frei |
| 2009/0055461 A1 | 2/2009 | Georgis |
| 2009/0083810 A1 | 3/2009 | Hattori |
| 2009/0228897 A1 | 9/2009 | Murray |
| 2009/0282158 A1 | 11/2009 | Courtemanche |
| 2010/0023636 A1 | 1/2010 | Huang |
| 2010/0146569 A1 | 6/2010 | Janardhan |
| 2010/0146576 A1 | 6/2010 | Costanzo |
| 2010/0161825 A1 | 6/2010 | Ronca |
| 2010/0191858 A1 | 7/2010 | Thomas |
| 2010/0217837 A1 | 8/2010 | Ansari |
| 2010/0223394 A1 | 9/2010 | Sherer |
| 2010/0318671 A1 | 12/2010 | Lee |
| 2011/0004695 A1 | 1/2011 | Van Oldenborgh |
| 2011/0055403 A1 | 3/2011 | Balachandran |
| 2011/0109725 A1 | 5/2011 | Yu |
| 2011/0110358 A1* | 5/2011 | Haartsen ............ H04N 21/4305 370/350 |
| 2011/0161509 A1 | 6/2011 | Courtemanche |
| 2011/0163939 A1 | 7/2011 | Tam |
| 2011/0225315 A1 | 9/2011 | Wexler |
| 2011/0235469 A1* | 9/2011 | Irwin .................. G04G 13/02 368/12 |
| 2012/0084829 A1 | 4/2012 | Kitazato |
| 2012/0144415 A1 | 6/2012 | Velusamy |
| 2012/0176469 A1 | 7/2012 | Moore |
| 2012/0185574 A1 | 7/2012 | Cho |
| 2012/0191862 A1 | 7/2012 | Kovvali |
| 2012/0215851 A1 | 8/2012 | Wu |
| 2012/0230510 A1 | 9/2012 | Dinescu |
| 2012/0297432 A1 | 11/2012 | Zhou |
| 2012/0311647 A1 | 12/2012 | Sharma |
| 2012/0324122 A1 | 12/2012 | Miles |
| 2013/0033496 A1 | 2/2013 | Raveendran |
| 2013/0057695 A1 | 3/2013 | Huisking |
| 2013/0104247 A1 | 4/2013 | Cakulev |
| 2013/0104249 A1 | 4/2013 | Cakulev |
| 2013/0117792 A1 | 5/2013 | Khouzam |
| 2013/0151723 A1 | 6/2013 | Xia |
| 2013/0166698 A1 | 6/2013 | Georgis |
| 2013/0169741 A1 | 7/2013 | Witt |
| 2013/0179605 A1 | 7/2013 | Huang |
| 2013/0246638 A1 | 9/2013 | Kovvali |
| 2013/0290418 A1 | 10/2013 | Liu |
| 2013/0304729 A1 | 11/2013 | Jiang |
| 2013/0304874 A1 | 11/2013 | Wexler |
| 2013/0316642 A1* | 11/2013 | Newham ............ H04W 52/0206 455/67.11 |
| 2014/0003322 A1 | 1/2014 | Grinshpun |
| 2014/0006499 A1 | 1/2014 | Ren |
| 2014/0025793 A1 | 1/2014 | Ramsdell |
| 2014/0122570 A1 | 5/2014 | Narvaez |
| 2014/0122589 A1 | 5/2014 | Fyke |
| 2014/0172971 A1 | 6/2014 | Akkurt |
| 2014/0172972 A1 | 6/2014 | Burba |
| 2014/0173022 A1 | 6/2014 | Morrison, III |
| 2014/0189008 A1 | 7/2014 | Park |
| 2014/0195642 A1 | 7/2014 | Georgis |
| 2014/0201259 A1 | 7/2014 | Bai |
| 2014/0267543 A1 | 9/2014 | Kerger |
| 2014/0298061 A1 | 10/2014 | Volvovski et al. |
| 2014/0298081 A1 | 10/2014 | Eschholz |
| 2014/0301202 A1 | 10/2014 | Bouazizi |
| 2015/0095453 A1 | 4/2015 | Jain |
| 2015/0100997 A1 | 4/2015 | Kitazato |
| 2015/0126169 A1 | 5/2015 | Kerger |
| 2015/0215816 A1 | 7/2015 | Abou-Elkheir |
| 2015/0222684 A1 | 8/2015 | Johansson |
| 2015/0263833 A1 | 9/2015 | Li |
| 2015/0312300 A1 | 10/2015 | Mosko |
| 2015/0341570 A1 | 11/2015 | Jaynes |
| 2015/0379617 A1 | 12/2015 | Khalsa |
| 2016/0050243 A1 | 2/2016 | De Vleeschauwer |
| 2016/0134704 A1 | 5/2016 | Morrison, III |
| 2016/0142327 A1 | 5/2016 | Johnson |
| 2016/0150005 A1 | 5/2016 | Choi |
| 2016/0157026 A1 | 6/2016 | Guindi et al. |
| 2016/0219358 A1 | 7/2016 | Shaffer et al. |
| 2016/0285784 A1 | 9/2016 | Burba |
| 2016/0286270 A1 | 9/2016 | Yuen |
| 2016/0360547 A1 | 12/2016 | Johnson |
| 2016/0373251 A1 | 12/2016 | Kumar |
| 2017/0099522 A1 | 4/2017 | Kitazato |
| 2017/0104816 A1 | 4/2017 | Yan |
| 2017/0187763 A1 | 6/2017 | Hsu |
| 2017/0195466 A1* | 7/2017 | Chen .................. H04R 1/1025 |
| 2017/0230453 A1 | 8/2017 | Verma |
| 2018/0013979 A1 | 1/2018 | Apelqvist |
| 2018/0041798 A1 | 2/2018 | Robbins |
| 2018/0091480 A1 | 3/2018 | Brown |
| 2018/0109627 A1 | 4/2018 | Marquardt |
| 2018/0199282 A1* | 7/2018 | Newham ............ H04W 52/0206 |
| 2019/0327778 A1* | 10/2019 | Morris .................. H04W 88/04 |
| 2019/0340091 A1 | 11/2019 | Chandrasekaran |
| 2020/0154358 A1* | 5/2020 | Lovich .................. H04B 1/385 |
| 2020/0186852 A1 | 6/2020 | Ramamurthy et al. |
| 2020/0196372 A1 | 6/2020 | Ouyang |
| 2020/0252993 A1 | 8/2020 | Srivastava |
| 2021/0235528 A1* | 7/2021 | Morris .................. H04W 4/70 |
| 2022/0046311 A1 | 2/2022 | Curtis |
| 2022/0158991 A1 | 5/2022 | Wahlberg |
| 2022/0360882 A1* | 11/2022 | Chan .................. H04R 1/1016 |
| 2023/0139601 A1* | 5/2023 | Graham ............ H04R 1/1041 381/74 |
| 2023/0156838 A1* | 5/2023 | Luo .................... H04R 1/1041 455/41.2 |
| 2023/0208892 A1 | 6/2023 | Nir |
| 2024/0407052 A1* | 12/2024 | Ouyang ................ H04L 1/0061 |

FOREIGN PATENT DOCUMENTS

| | | |
|---|---|---|
| CN | 101512516 A | 8/2009 |
| CN | 103929468 B | 8/2017 |
| GB | 2519640 A | 4/2015 |
| JP | 5175288 B2 | 4/2013 |
| KR | 20140120465 A | 10/2014 |
| KR | 20140122599 A | 10/2014 |
| KR | 101479582 B1 | 1/2015 |
| KR | 101531856 B1 | 6/2015 |
| MY | 155010 A | 8/2015 |
| WO | 0110125 A1 | 2/2001 |
| WO | 2008030759 A1 | 3/2008 |

(56) References Cited

FOREIGN PATENT DOCUMENTS

| WO | 2008115437 A2 | 9/2008 |
|---|---|---|
| WO | 2020159670 A1 | 8/2020 |

OTHER PUBLICATIONS

United States Patent and Trademark Office, "Non-Final Office Action," mailed in connection with U.S. Appl. No. 14/998,311, on Jul. 14, 2017, 27 pages.

Nakayama et al., Peer-to-Peer Bidirectional Streaming Using Mobile Edge Computing, Nov. 19, 2017, 2017 Fifth International Symposium on Computing and Networking (CANDAR), DOI: 10.1109/CANDAR.2017.38 (Year: 2017).

United States Patent and Trademark Office, "Final Office Action," mailed in connection with U.S. Appl. No. 14/998,311, on Jan. 11, 2018, 29 pages.

United States Patent and Trademark Office, "Notice of Allowance," mailed in connection with U.S. Appl. No. 14/998,311, dated May 18, 2018, 10 pages.

International Preliminary Report on Patentability (IPRP) issued by the International Bureau in corresponding International Patent Application No. PCT/US2016/063574 dated Jun. 16, 2018, 7 pages.

United States Patent and Trademark Office, "Non-Final Office Action" issued in connection with U.S. Appl. No. 16/150,264 on Aug. 7, 2019 (22 pages).

United States Patent and Trademark Office, "Notice of Allowance" issued in connection with U.S. Appl. No. 16/150,264 on Apr. 28, 2020 (8 pages).

United States Patent and Trademark Office, "Non-Final Office Action" issued in connection with U.S. Appl. No. 16/944,703 on Dec. 8, 2021 (12 pages).

United States Patent and Trademark Office, "Notice of Allowance" issued in connection with U.S. Appl. No. 16/944,703 on Mar. 31, 2022 (10 pages).

United States Patent and Trademark Office, "Non-Final Rejection," mailed in connection with the U.S. Appl. No. 17/872,788, on Apr. 26, 2023, 20 pages.

United States Patent and Trademark Office, "Final Office Action," issued in connection with U.S. Appl. No. 17/872,788, mailed on Sep. 8, 2023, 16 pages.

United States Patent and Trademark Office, "Notice of Allowance and Fee(s) Due," issued in connection with U.S. Appl. No. 17/872,788, dated Dec. 8, 2023, 8 pages.

United States Patent and Trademark Office, "Notice of Allowance and Fee(s) Due," issued in connection with U.S. Appl. No. 17/872,788, dated Mar. 14, 2024, 9 pages.

\* cited by examiner

TECHNOLOGIES FOR STREAMING DEVICE ROLE REVERSAL

RELATED APPLICATIONS

This patent arises from a continuation of U.S. patent application Ser. No. 17/872,788, filed on Jul. 25, 2022, and titled "TECHNOLOGIES FOR STREAMING DEVICE ROLE REVERSAL," which is a continuation of U.S. patent application Ser. No. 16/944,703, filed on Jul. 31, 2020, and titled "TECHNOLOGIES FOR STREAMING DEVICE ROLE REVERSAL," which is a continuation of U.S. patent application Ser. No. 16/150,264, filed on Oct. 2, 2018, and titled "TECHNOLOGIES FOR STREAMING DEVICE ROLE REVERSAL," which is a continuation of U.S. patent application Ser. No. 14/998,311, filed on Dec. 26, 2015, and titled "TECHNOLOGIES FOR STREAMING DEVICE ROLE REVERSAL." Priority to U.S. patent application Ser. No. 17/872,788, U.S. patent application Ser. No. 16/944,703, U.S. patent application Ser. No. 16/150,264 and U.S. patent application Ser. No. 14/998,311 is claimed. U.S. patent application Ser. No. 17/872,788, U.S. patent application Ser. No. 16/944,703, U.S. patent application Ser. No. 16/150,264 and U.S. patent application Ser. No. 14/998,311 are incorporated herein by reference in their respective entireties.

BACKGROUND

Traditionally, playback of digital media content (e.g., movies, music, pictures, games, etc.) has been constrained to the computing device (e.g., desktop computer, smartphone, tablet, wearable, gaming system, television, etc.) on which the digital media content was stored. However, with the advent of cloud computing related technologies and increased capabilities of computing devices, services such as digital media content transmission services (i.e., streaming, casting, mirroring, etc.) have spurred along the generation, sharing, and consumption of digital media content as consumer devices capable of interacting with such content have become ubiquitous. The desire to share digital media content between consumer interfacing computing devices, especially in a home environment, is increasing in tandem with the increased exposure of consumers to the digital media content and providers of such digital media content.

The introduction of stream-enabled computing devices has enabled digital media content to be streamed, casted, or mirrored from one computing device (e.g., a smartphone, a laptop, etc.) to another compatible computing device (e.g., a smart television, a speaker, etc.) directly, or indirectly, such as via a compatible hub, dongle, etc., connected to the other computing device. In other words, digital media content stored on one computing device can be transmitted to a receiving computing device and received/rendered at the receiving computing device. Present solutions allow manufacturer agnostic wireless streaming of the digital media content using various wireless communication technologies employed by computing devices supporting Wi-Fi®, Digital Living Network Alliance (DLNA), Bluetooth®, etc., via one-way transmission/reception. In other words, present solutions allow for one computing device to be setup as the local processor/transmitter of the content stream, while the other computing device is setup as a receiver device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
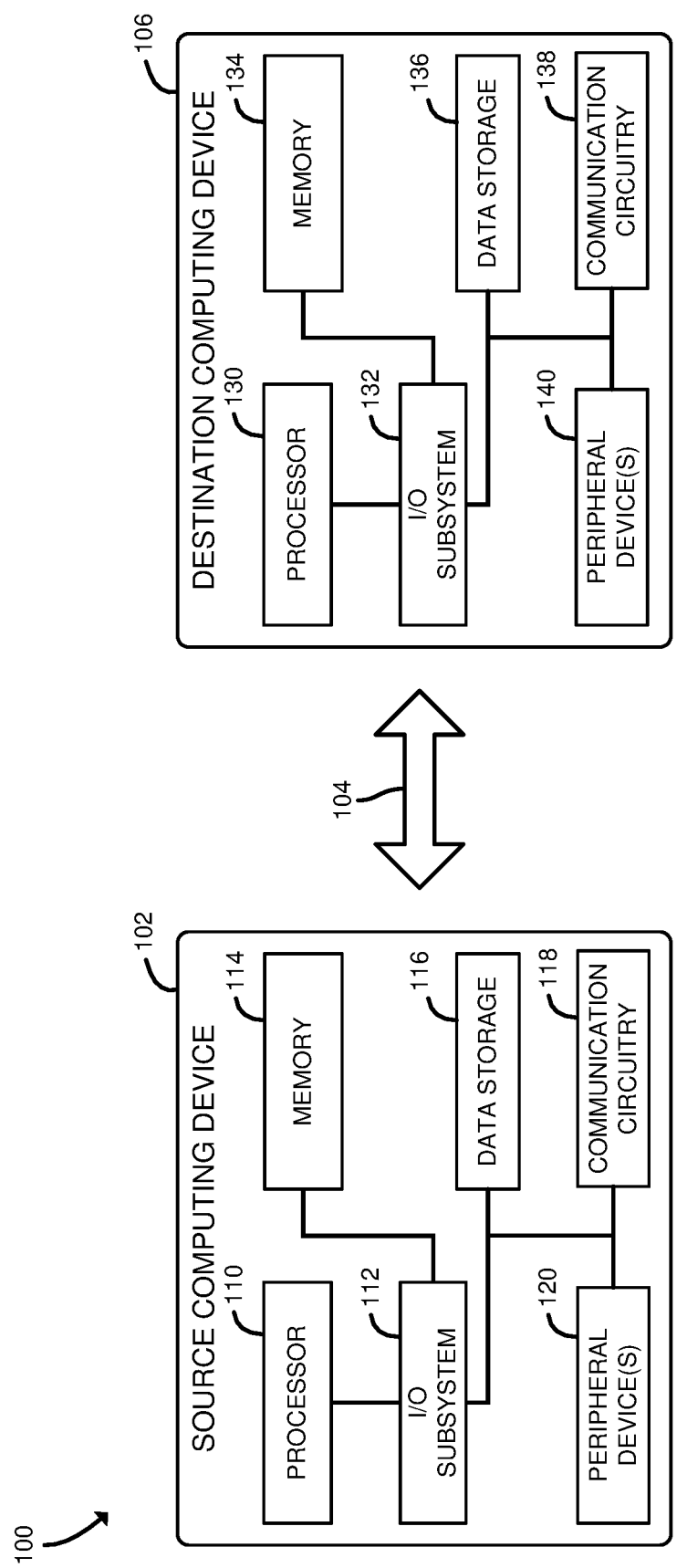
FIG. 1 is a simplified block diagram of at least one embodiment of a system for streaming device role reversal.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for streaming device role reversal includes a source computing device 102 communicatively coupled to a destination computing device 106 via a communication channel 104. In use, the source computing device 102 transmits (e.g., casts, streams, mirrors, etc.) digital media content (e.g., video, audio, text, etc.) to the destination computing device 106 via the communication channel 104, which may be established over a wired or wireless connection. Prior to transmitting the digital content, and subsequent to establishing the communication channel 104 (e.g., a TCP connection via the network layer, or layer 3, of the Open Systems Interconnection (OSI) model using a negotiated IP address), the source computing device 102 and the destination computing device 106 perform a role reversal capability negotiation to determine whether role reversal is supported by the source computing device 102 and the destination computing device 106.

Unlike present technologies, in which the source computing device 102 is configured to locally process and transmit digital media content for display on the destination computing device 106, and the destination computing device 106 is configured to receive and display the received digital media content, in the present disclosure, the roles (i.e., transmitter or receiver) may be reversed seamlessly. In other words, if both the source computing device 102 and the destination computing device 106 support role reversal, each is capable of being switched between receiving and transmitting digital media content over the established communication channel 104.

For example, the source computing device 102 may be prompted by a user of the source computing device 102 to stream content locally and cast the streamed content to the destination computing device 106. In use, the source computing device 102 determines whether processing (e.g., downloading, decoding, rendering, display, etc.) of the content stream can be offloaded. In other words, the source computing device 102 determines whether the content stream is local content or off-device content that is to be streamed, such as a video that may be accessed through the Internet via a uniform resource identifier (URI), such as a uniform resource locator (URL), accessible to the destination computing device 106. If so, the source computing device 102 can then determine which of the source computing device 102 and the destination computing device 106 are better suited (e.g., based on capabilities, settings, etc.) to process the content locally.

Upon determining the source computing device 102 is best suited, the content is streamed to and processed by the source computing device 102 and casted to the destination computing device 106 as initially configured. However, upon a determination that the destination computing device 106 is best suited, each of the source computing device 102 and the destination computing device 106 reconfigure their functionality to reverse roles. In other words, the source computing device 102 becomes the receiver and the destination computing device 106 becomes the processor and transmitter of the content stream.

The source computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a smart appliance, a smart television, a processor-based system, a multiprocessor system, and/or any other computing/communication device.

As shown in FIG. 1, the illustrative source computing device 102 includes a processor 110, an input/output (I/O) subsystem 112, a memory 114, a data storage device 116, communication circuitry 118, and one or more peripheral devices 120. Of course, in other embodiments, the source computing device 102 may include other or additional components, such as those commonly found in a computing device. Further, in some embodiments, one or more of the illustrative components may be omitted from the source computing device 102. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. The memory 114 may be embodied as any type of volatile or non-volatile memory or data storage capable of performing the functions described herein. In operation, the memory 114 may store various data and software used during operation of the source computing device 102, such as operating systems, applications, programs, libraries, and drivers.

The memory 114 is communicatively coupled to the processor 110 via the I/O subsystem 112, which may be embodied as circuitry and/or components to facilitate input/output operations with the processor 110, the memory 114, and other components of the source computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and/or other components of the source computing device 102, on a single integrated circuit chip.

The data storage device 116 may be embodied as any type of device or devices configured for short-term or long-term storage of data, such as memory devices and circuits, memory cards, hard disk drives, solid-state drives, or other data storage devices, for example. It should be appreciated that the data storage device 116 and/or the memory 114 (e.g., the computer-readable storage media) may store various types of data capable of being executed by a processor (e.g., the processor 110) of the source computing device 102, including operating systems, applications, programs, libraries, drivers, instructions, etc.

The communication circuitry 118 may be embodied as any communication circuit, device, or collection thereof, capable of enabling communications between the source computing device 102 and other computing devices (e.g., the destination computing device 106) over a wired or wireless communication channel (e.g., the communication channel 104). For example, the communication circuitry 118 may include a network interface controller (NIC) and/or other devices capable of performing networking-related operations which are not shown for clarity of the description.

The communication circuitry 118 may be configured to use any one or more wired or wireless communication technologies and associated protocols (e.g., Ethernet, Wi-Fi®, Bluetooth®, Bluetooth® Low Energy (BLE), near-field communication (NFC), Worldwide Interoperability for Microwave Access (WiMAX), Digital Living Network Alliance (DLNA), etc.) to affect such communication. The communication circuitry 118 may be additionally configured to use any one or more wireless and/or wired communication technologies and associated protocols to effect communication with other computing devices, such as over a network, for example.

The peripheral devices 120 may include any number of input/output devices, interface devices, and/or other peripheral devices. For example, in some embodiments, the peripheral devices 120 may include a display, a touch screen, graphics circuitry, a keyboard, a mouse, a microphone, a speaker, and/or other input/output devices, interface devices, and/or peripheral devices. The particular devices included in the peripheral devices 120 may depend on, for example, the type and/or intended use of the source computing device 102. The peripheral devices 120 may additionally or alternatively include one or more ports, such as a USB port, for example, for connecting external peripheral devices to the source computing device 102.

Similar to the source computing device 102, the destination computing device 106 may be embodied as any type of computation or computing device capable of performing the functions described herein, including, without limitation, a computer, a portable computing device (e.g., smartphone, tablet, laptop, notebook, wearable, etc.), a smart television, a smart appliance, a projector, a cast hub, a cast dongle, a processor-based system, and/or a multiprocessor system. As shown in FIG. 1, the illustrative destination computing device 106, similar to the source computing device 102, includes a processor 130, an I/O subsystem 132, a memory 134, a data storage device 136, communication circuitry 138, and one or more peripheral devices 140. As such, further descriptions of the like components are not repeated herein with the understanding that the description of the corresponding components provided above in regard to the source computing device 102 applies equally to the corresponding components of the destination computing device 106.

Figure 2:
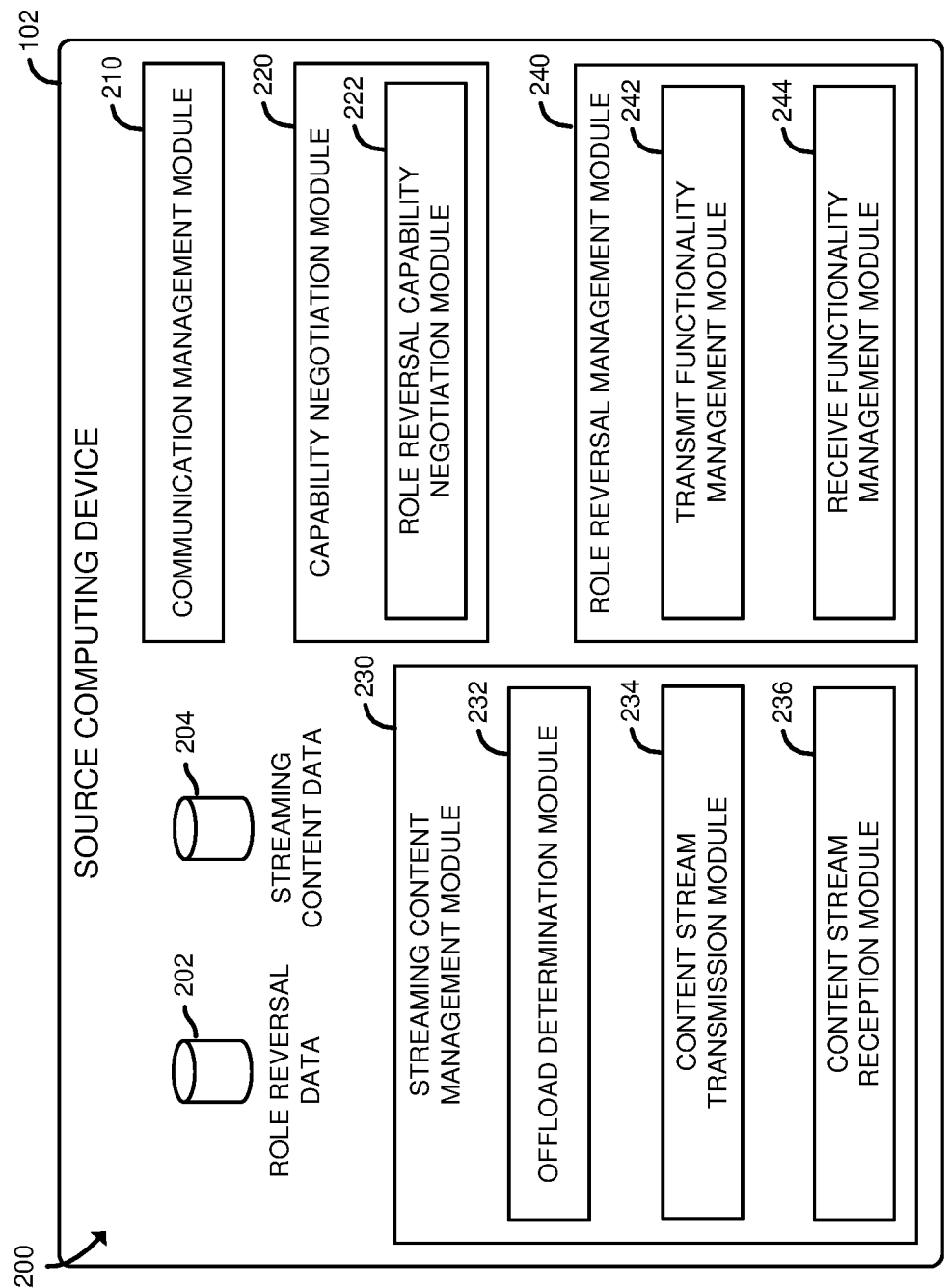
FIG. 2 is a simplified block diagram of at least one embodiment of an environment of the source computing device of the system of FIG. 1.

Referring now to FIG. 2, in an illustrative embodiment, the source computing device 102 establishes an environment 200 during operation. The illustrative environment 200 includes a communication management module 210, a capability negotiation module 220, a streaming content management module 230, and a role reversal management module 240. The various modules of the environment 200 may be embodied as hardware, firmware, software, or a combination thereof. As such, in some embodiments, one or more of the modules of the environment 200 may be embodied as circuitry or collection of electrical devices (e.g., a communication management circuit 210, a capability negotiation circuit 220, a streaming content management circuit 230, a role reversal management circuit 240, etc.).

It should be appreciated that, in such embodiments, one or more of the communication management circuit 210, the capability negotiation circuit 220, the streaming content management circuit 230, and the role reversal management circuit 240 may form a portion of one or more of the processor 110, the I/O subsystem 112, and/or other components of the source computing device 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 110 or other components of the source computing device 102.

In the illustrative environment 200, the source computing device 102 includes role reversal data 202 and streaming content data 204, each of which may be stored in the memory 114 and/or the data storage device 116 of the source computing device 102. Further, each of the role reversal data 202 and the streaming content data 204 may be accessed by the various modules and/or sub-modules of the source computing device 102. It should be appreciated that the source computing device 102 may include additional and/or alternative components, sub-components, modules, sub-modules, and/or devices commonly found in a computing device, which are not illustrated in FIG. 2 for clarity of the description.

The communication management module 210, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the source computing device 102. To do so, the communication management module 210 is configured to receive and process network packets from other computing devices (e.g., the destination computing device 106 and/or other computing device(s) communicatively coupled to the source computing device 102). Additionally, the communication management module 210 is configured to prepare and transmit network packets to another computing device (e.g., the destination computing device 106 and/or other computing device(s) communicatively coupled to the source computing device 102). The communication management module 210 is further configured to establish a communication channel (e.g., the communication channel 104 of FIG. 1) at the network layer (i.e., the IP layer) with other computing devices that the source computing device 102 is communicatively coupled with. Accordingly, in some embodiments, at least a portion of the functionality of the communication management module 210 may be performed by the communication circuitry 118 of the source computing device 102, or more specifically by a network interface controller (NIC) (not shown) of the communication circuitry 118.

The capability negotiation module 220, which may be embodied as hardware, firmware, software, virtualized hardware, emulated architecture, and/or a combination thereof as discussed above, is configured to manage capability negotiations between the source computing device 102 and the destination computing device 106. To do so, the capability negotiation module 220 is configured to generate request messages for transmission that indicate supported capabilities, such as supported video codecs, supported resolutions, network port numbers, etc., as well as component capability information, such as processor specifications (e.g., number of processor cores, clock speed, cache size, hyperthreading support, etc.), memory specifications (e.g., total memory size, available memory size, etc.), battery life, and the like. The capability negotiation module 220 is further configured to receive response messages that indicate like or similar capabilities of the computing device to which the request messages were sent.

The illustrative capability negotiation module 220 includes a role reversal capability negotiation module 222 that is configured to negotiate, or exchange, role reversal capabilities. To do so, the role reversal capability negotiation module 222 is configured provide a message (e.g., a real-time streaming protocol (RTSP) message) that includes a role reversal capability indication usable to identify whether the source computing device 102 supports role reversal. For example, in some embodiments, the role reversal capability indication may be a Boolean value, in which a supported value, or value of "1", may be used to indicate that role reversal is supported, while a not supported value, or value of "0", may be used to indicate that role reversal is not supported. In some embodiments, the role reversal capability indication, as well as any supported capabilities relevant to the role reversal process may be stored in the role reversal data 202.

The streaming content management module 230, which may be embodied as hardware, firmware, software, virtualized hardware, emulated architecture, and/or a combination thereof as discussed above, is configured to transmit (e.g., cast, stream, mirror, etc.) and/or receive digital media content, as well as to determine whether to transmit (e.g., cast, stream, mirror, etc.) or receive digital media content. To do so, the illustrative streaming content management module 230 includes an offload determination module 232, a content stream transmission module 234, and a content stream reception module 236. In some embodiments, the digital media content to be transmitted or received may be stored in the streaming content data 204.

It should be appreciated that each of the offload determination module 232, the content stream transmission module 234, and the content stream reception module 236 of the streaming content management module 230 may be separately embodied as hardware, firmware, software, virtualized hardware, emulated architecture, and/or a combination thereof. For example, the offload determination module 232 may be embodied as a hardware component, while the content stream transmission module 234 and/or the content stream reception module 236 is embodied as a virtualized hardware component or as some other combination of hardware, firmware, software, virtualized hardware, emulated architecture, and/or a combination thereof.

The offload determination module 232 is configured to determine whether the digital media content to be transmitted is capable of being offloaded to the destination computing device 106. For example, the offload determination module 232 is configured to determine whether the content is local to the source computing device 102 or remote and accessible via a URI. The offload determination module 232 is configured to determine whether to offload the processing of the content to the destination computing device 106 (i.e., whether the processing should be offloaded). To do so, the offload determination module 232 may be configured to determine whether the destination computing device 106 is capable of accessing the remote content (e.g., whether the destination computing device 106 has Internet access), which of the source computing device 102 and the destination computing device 106 has more optimal capabilities to process the particular type of content, such as may be based on the processor specs, memory specs, power source, etc.

The content stream transmission module 234 is configured to locally process and transmit the content to the destination computing device 106. The content stream reception module 236 is configured to receive the content stream from the destination computing device 106. Each of the content stream transmission module 234 and content stream reception module 236 are configured to display (i.e., decode, render, and output) the content stream, whether locally processed (i.e., by the content stream transmission module 234) or received from the destination computing device 106 (i.e., by the content stream reception module 236).

The role reversal management module 240, which may be embodied as hardware, firmware, software, virtualized hardware, emulated architecture, and/or a combination thereof as discussed above, is configured to manage the role reversal process. To do so, the illustrative role reversal management module 240 includes a transmit functionality management module 242 and a receive functionality management module 244. The transmit functionality management module 242 is configured to enable or disable the transmit functionality of the source computing device 102, depending on the role of the source computing device 102. Similarly, the receive functionality management module 244 is configured to enable or disable the receive functionality of the source computing device 102, depending on the role of the source computing device 102. It should be appreciated that the role reversal management module 240 is configured to execute the role reversal over the same communication channel, such that the content transmission/reception is substantially uninterrupted.

Figure 3:
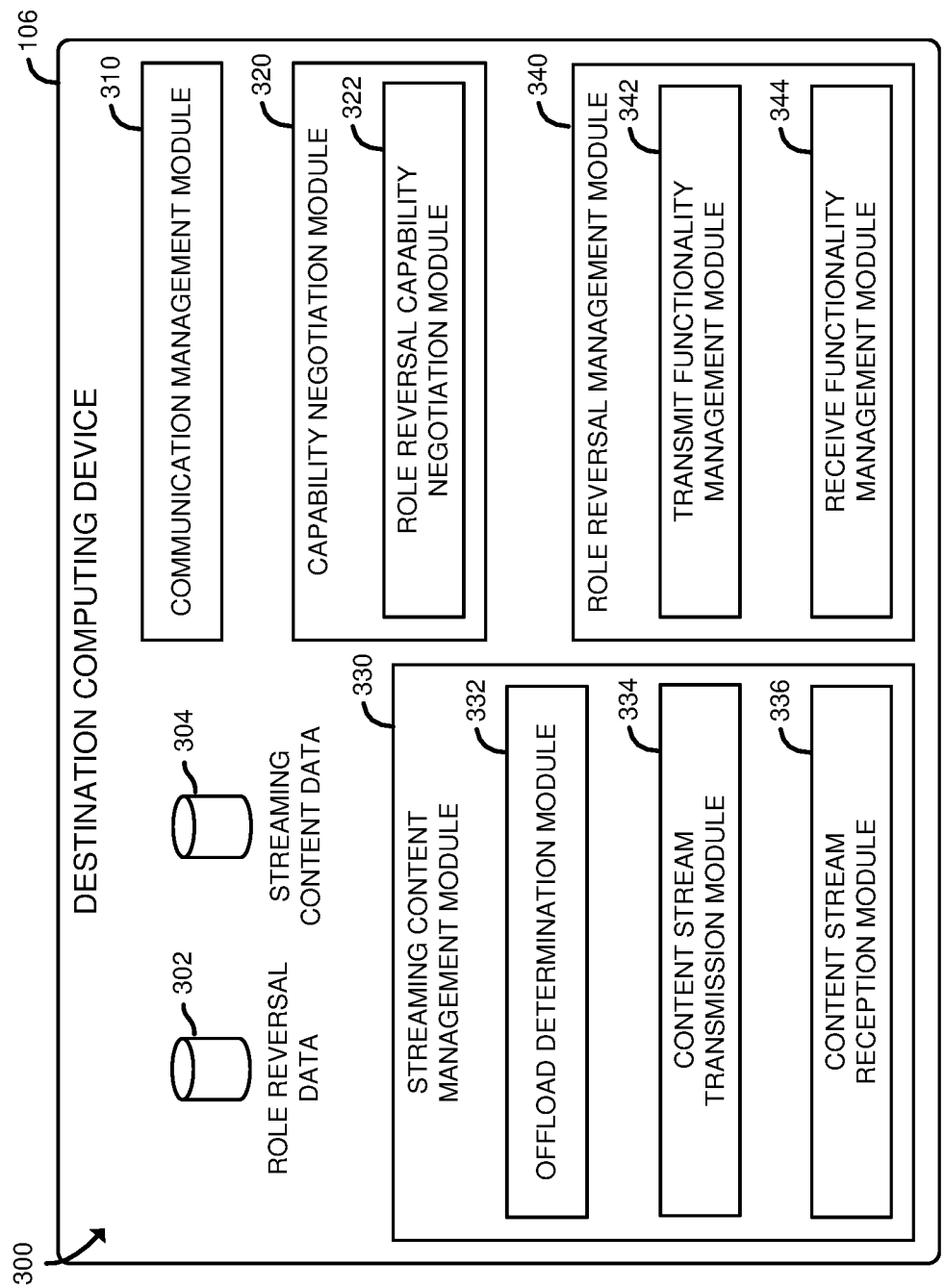
FIG. 3 is a simplified block diagram of at least one embodiment of an environment of the destination computing device of the system of FIG. 1.

Referring now to FIG. 3, in an illustrative embodiment, the destination computing device 106 establishes an environment 300 during operation. Similar to the illustrative environment 200 of the source computing device 102 of FIG. 2, the illustrative environment 300 includes a communication management module 310, a capability negotiation module 320, a streaming content management module 330, and a role reversal management module 340. As such, further descriptions of the like modules are not repeated herein with the understanding that the description of the corresponding components provided above in regard to the illustrative environment 200 of the source computing device 102 of FIG. 2 applies equally to the corresponding components of the illustrative environment 300 of the destination computing device 106 of FIG. 3.

It should be appreciated that, similar to the various modules of the illustrative environment 200 of FIG. 2, the various modules of the environment 300 may be embodied as hardware, firmware, software, or a combination thereof. As such, in some embodiments, one or more of the modules of the environment 300 may be embodied as circuitry or collection of electrical devices (e.g., a communication management circuit 310, a capability negotiation circuit 320, a streaming content management circuit 330, and a role reversal management circuit 340, etc.). It should be appreciated that, in such embodiments, one or more of the communication management circuit 310, the capability negotiation circuit 320, the streaming content management circuit 330, and the role reversal management circuit 340 may form a portion of one or more of the processor 130, the I/O subsystem 132, and/or other components of the destination computing device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 130 or other components of the destination computing device 106.

It should be appreciated that, when the destination computing device 106 is configured as a transmitter (i.e., the roles have been reversed), the offload determination module 332 of the streaming content management module 330 may be additionally configured to determine whether processing of the content should continue to be offloaded (i.e., whether the roles should remain reversed), such as may be determined based on updated characteristics of the source computing device 102 and/or the destination computing device 106, or whether the content to be processed at the destination computing device 106 no longer requires being processed (e.g., a video being processed has ended), etc. Additionally, the streaming content management module 330 is further configured to exit the role reversal (i.e., resume initial receiver functionality) upon a determination by the offload determination module 332 that processing of the content should no longer be performed at the destination computing device 106 (i.e., should no longer be offloaded).

In some embodiments, one or more of the modules of the environment 300 may be embodied as circuitry or a collection of electrical devices (e.g., communication management circuitry 310, capability negotiation circuitry 320, streaming content management circuitry 330, role reversal management module 340, etc.). In the illustrative environment 300, the destination computing device 106 includes role reversal data 302 and streaming content data 304, each of which may be stored in the memory 134 and/or the data storage device 136 of the destination computing device 106. Further, each of the role reversal data 302 and the streaming content data 304 may be accessed by the various modules and/or sub-modules of the destination computing device 106. It should be appreciated that the destination computing device 106 may include additional and/or alternative components, sub-components, modules, sub-modules, and/or devices commonly found in a computing device, which are not illustrated in FIG. 3 for clarity of the description.

Figure 4:
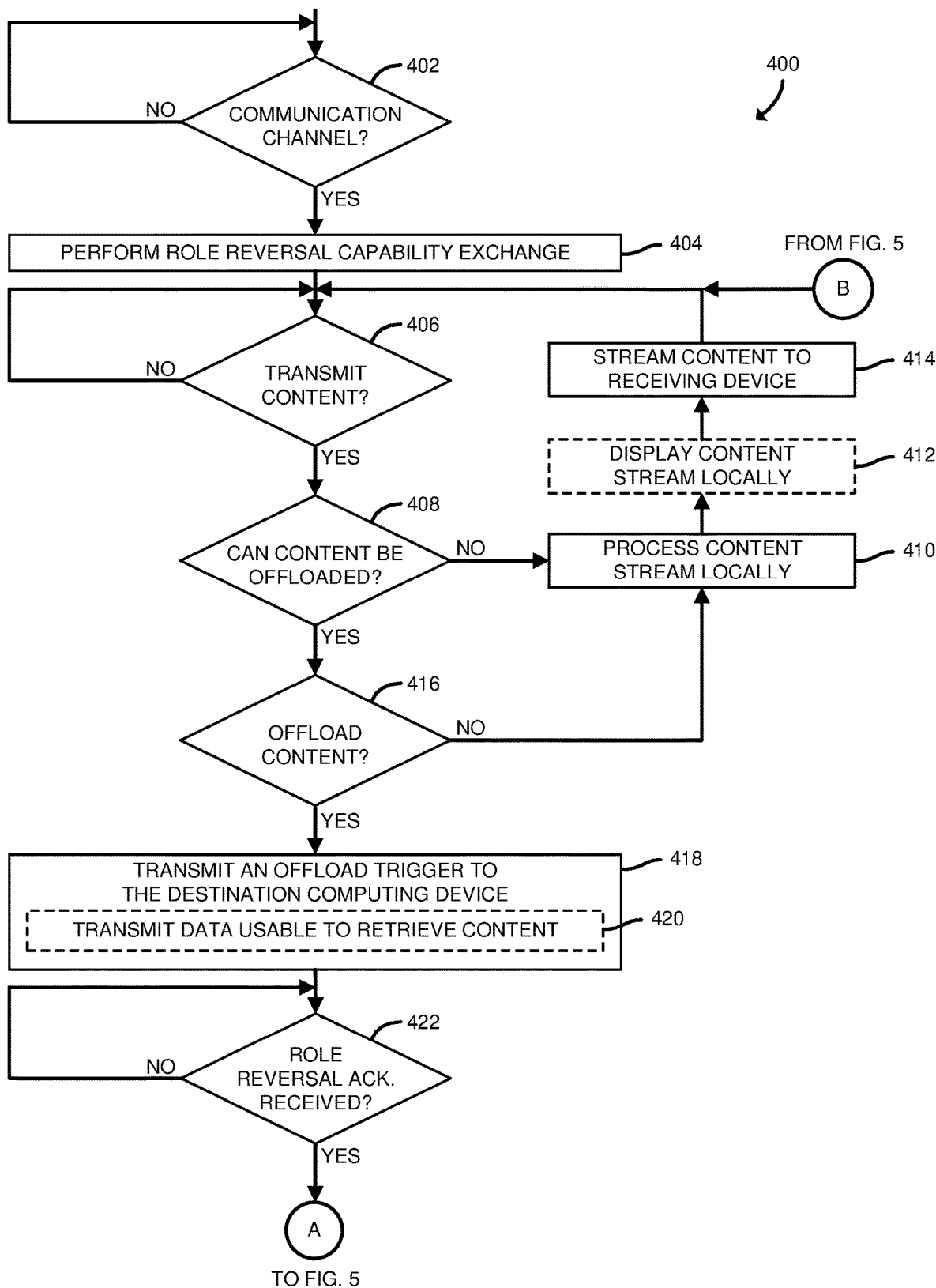
FIGS. 4 and 5 are a simplified flow diagram of at least one embodiment for streaming device role reversal that may be executed by the source computing device of FIGS. 1 and 2.
Figure 5:
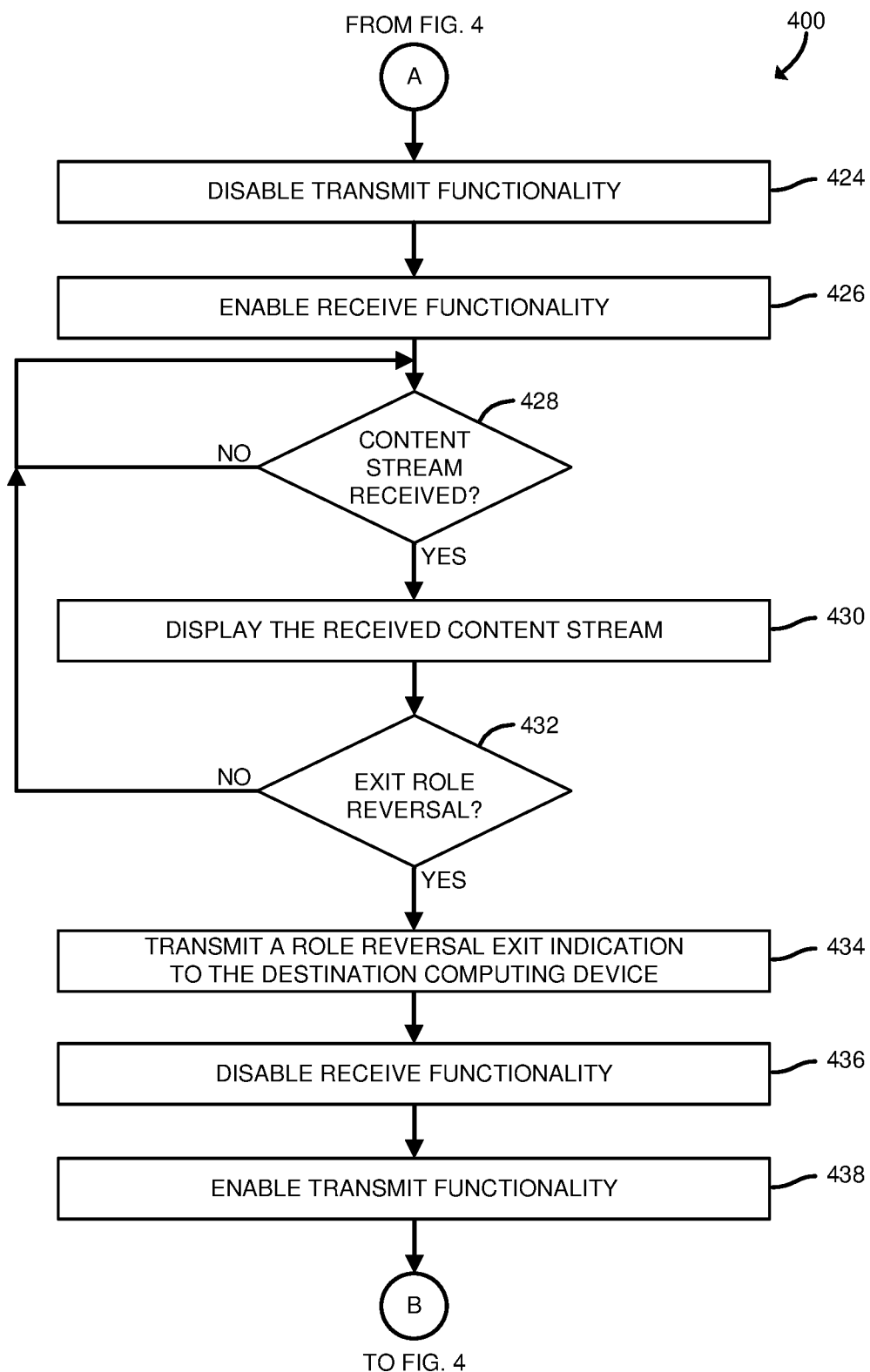

Referring now to FIGS. 4 and 5, in use, the source computing device 102 may execute a method 400 for streaming device role reversal. It should be appreciated that at least a portion of method 400 may be embodied as various instructions stored on a computer-readable media, which may be executed by the processor 110, the communication circuitry 118, and/or other components of the source computing device 102 to cause the source computing device 102 to perform the method 400. The computer-readable media may be embodied as any type of media capable of being read by the source computing device 102 including, but not limited to, the memory 114, the data storage device 116, a local memory of a NIC (not shown) of the communication circuitry 118, other memory or data storage devices of the source computing device 102, portable media readable by a peripheral device of the source computing device 102, and/or other media.

The method 400 begins in block 402, in which the source computing device 102 determines whether a communication channel (e.g., the communication channel 104 of FIG. 1) has been established between the source computing device 102 and the destination computing device 106. If so, the method 400 advances to block 404, wherein the source computing device 102 performs a role reversal capability exchange. As described previously, the role reversal capability exchange may include transmitting a request message that includes a role reversal capability indication usable by the receiving computing device (e.g., the destination computing device 106) to determine role reversal capabilities of the source computing device 102, such as whether role reversal is supported by the source computing device 102. As also described previously, the capability exchange may additionally include receiving a response message from the receiving computing device (e.g., the destination computing device 106) with a role reversal capability indication usable by the source computing device 102 to determine role reversal capabilities of the receiving computing device (e.g., the destination computing device 106), such as whether role reversal is supported by the receiving computing device (e.g., the destination computing device 106).

Upon completion of the role reversal capability exchange, the method 400 advances to block 406, in which the source computing device 102 determines whether content is to be transmitted (i.e., streamed, casted, mirrored) to the destination computing device 106, such as may be prompted by an application in response to a user input at the source computing device 102, for example. If the source computing device 102 determines content is to be streamed, the method 400 advances to block 408, in which the source computing device 102 determines whether the content can be offloaded. To do so, the source computing device 102 determines whether the destination computing device 106 supports processing of the offloaded content (i.e., the destination computing device 106 supports role reversal) and whether the content can be accessed by the destination computing device 106 (e.g., has an Internet connection by which to retrieve the remotely located content).

If the source computing device 102 determines the content cannot be offloaded in block 408, the method 400 branches to block 410, in which the source computing device 102 processes the content stream locally. In some embodiments, in block 412, the source computing device 102 may display the content stream local (i.e., in addition to streaming the content). In block 414, the source computing device 102 streams the content to the destination computing device 106 for display at the destination computing device 106.

If the source computing device 102 determines the content can be offloaded in block 408, the method 400 branches to block 416, in which the source computing device 102 determines whether to offload the offloadable content. As described previously, the source computing device 102 may be configured to compare component specifications, settings, supported features, power availability, etc., of the source computing device 102 and the destination computing device 106 to determine whether processing of the offloadable content should be performed by the source computing device 102 or the destination computing device 106.

If the source computing device 102 determines not to offload the content in block 416, the method 400 branches to block 410, in which the source computing device 102 process the content stream locally, as described above. Otherwise, if the source computing device 102 determines to offload the content in block 416, the method 400 branches to block 418, in which the source computing device 102 transmits an offload trigger to the destination computing device 106. The offload trigger may be a message (e.g., an RTSP message) that includes a role reversal indicator that indicates to the receiving device (e.g., the destination computing device 106) whether role reversal is active or not. In other words, the offload trigger is usable by the destination computing device 106 to determine whether the destination computing device 106 should be enable receiver functionality (i.e., roles not reversed) or transmitter functionality (i.e., roles reversed). In some embodiments, in block 420 the source computing device 102 transmits additional data which may include any data usable by the destination computing device 106 to run/launch the content, such as a URI, an identifier/name an application on the destination computing device 106 to launch the URI, a file name corresponding to a file that includes the content which is stored local to the destination computing device 106, etc.

In block 422, the source computing device 102 determines whether a role reversal acknowledgment was received. If so, the method 400 advances to block 424 in FIG. 5, in which the source computing device 102 disables, or otherwise pauses, transmit functionality of the source computing device 102. In block 426, the source computing device 102 enables, or otherwise launches, receive functionality of source computing device 102. For example, the source computing device 102 may launch a receive application in a special mode that bypasses peer-to-peer and RTSP phases of the connection. It should be appreciated that one or more connection parameters (e.g., an IP address of the destination computing device 106, a local network interface of the source computing device 102, an RTSP port number, etc.) used to establish the connection between the source computing device 102 and the destination computing device 106 may be passed to the receive function/application.

In block 428, the source computing device 102 determines whether a content stream has been received from the destination computing device 106. If so, the method 400 advances to block 430, in which the source computing device 102 displays the received content stream. It should be appreciated that displaying the received content stream may include decoding the content stream, rendering the digital media of the content stream (e.g., at a graphics processing unit (GPU) (not shown) of the source computing device 102), and output the rendered digital media to a display of the source computing device 102.

It should be further appreciated that a user of the source computing device 102 may or may not be made aware of the present role of the source computing device 102 and/or the destination computing device 106. However, it should be further appreciated that any user interaction with the source computing device 102 with regards to the content is to be accepted by the source computing device 102 and an indication of such is to be transmitted to the destination computing device 106. As such, the indication should be formatted such that the destination computing device 106 can achieve the same functionality the input would have provided, had the content been being processed by the source computing device 102. Accordingly, in some embodiments, additional communication channels (e.g., TCP, UDP, etc.) may be established between the source computing device 102 and the destination computing device 106 while in role reversal mode in order to pass additional controls/indications.

In block 432, the source computing device 102 determines whether to exit role reversal. It should be appreciated that various factors may influence whether the source computing device 102 exits role reversal. For example, one or more component characteristics (e.g., available memory, battery life, etc.), settings, and/or dynamic capabilities of the source computing device 102 and/or the destination computing device 106 may be used to determine whether to continue or exit role reversal. If the source computing device 102 determines to exit role reversal, the method 400 advances to block 434; otherwise, the method 400 loops back to block 428, in which the source computing device 102 determines whether the content stream continues to be received. In block 434, the source computing device 102 transmits a role reversal indication via a message to the destination computing device 106. In block 436, the source computing device 102 disables, or otherwise pauses, receive functionality of the source computing device 102. In block 436, the source computing device 102 enables, or otherwise resumes, transmit functionality of the source computing device 102 before the method 400 returns to block 406 to determine whether content is available to be streamed.

Figure 6:
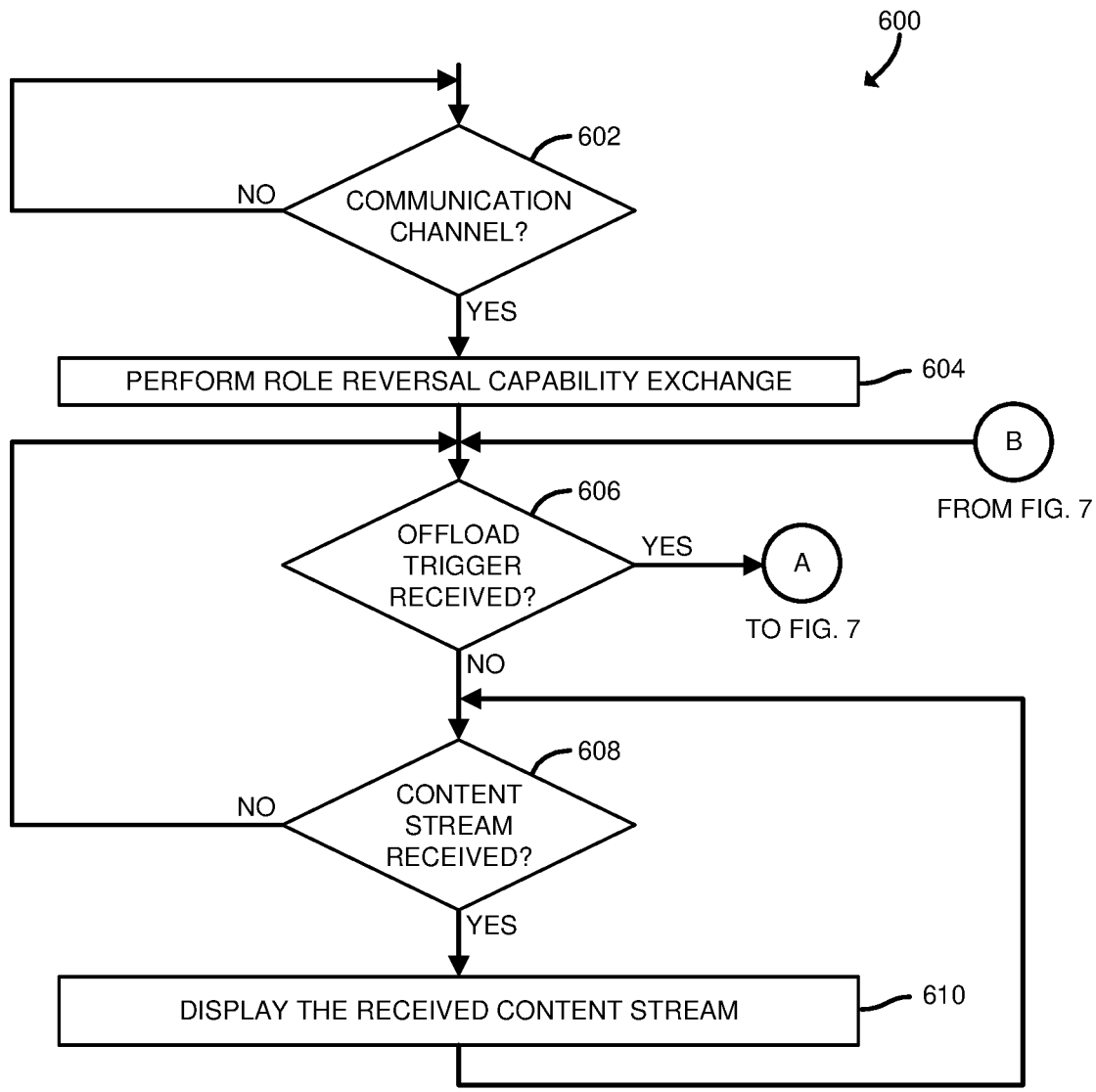
FIGS. 6 and 7 are a simplified flow diagram of at least one embodiment for the streaming device role reversal that may be executed by the destination computing device of FIGS. 1 and 3.
Figure 7:
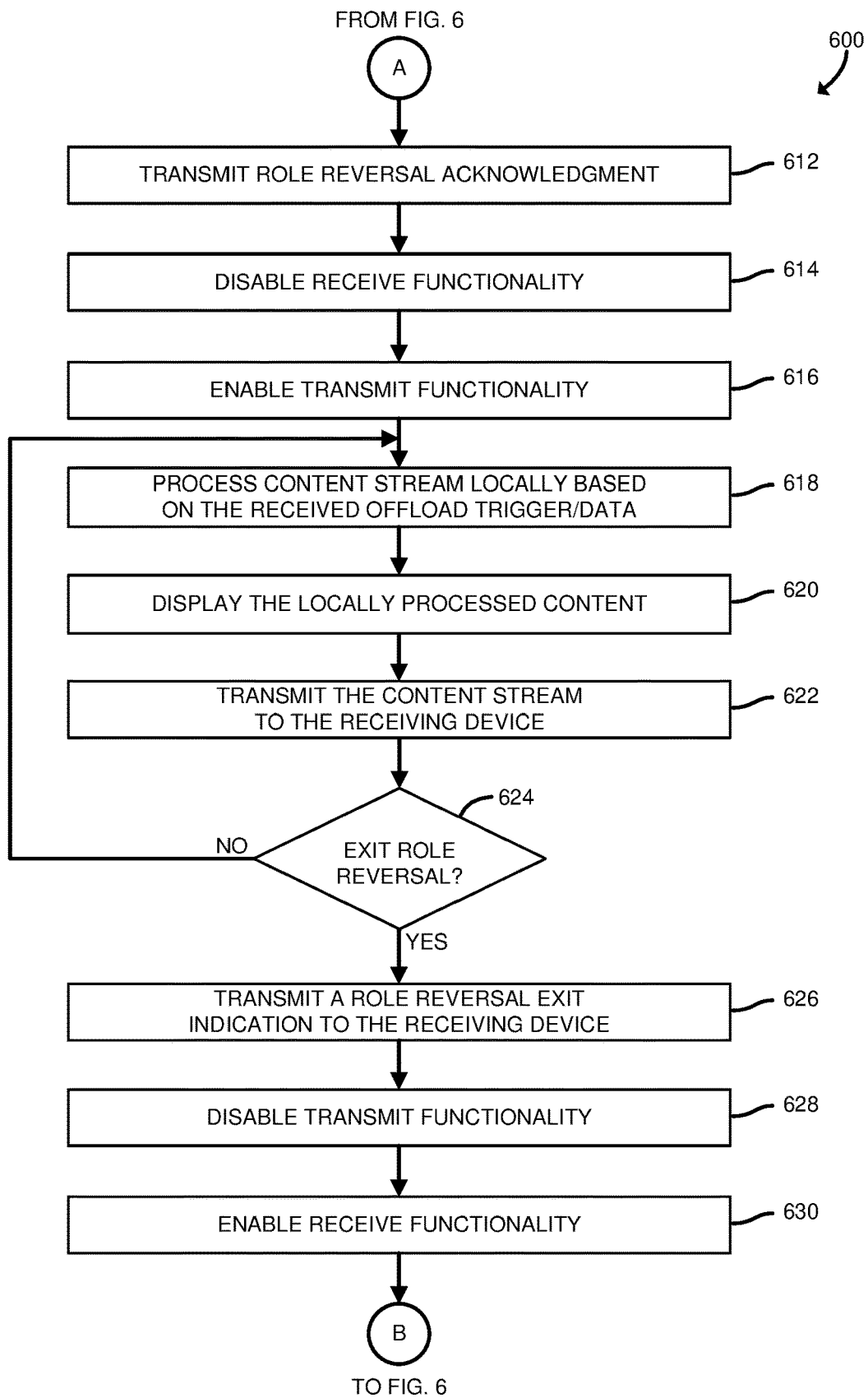

Referring now to FIGS. 6 and 7, in use, the destination computing device 106 may execute a method 600 for streaming device role reversal. It should be appreciated that at least a portion of method 600 may be embodied as various instructions stored on a computer-readable media, which may be executed by the processor 130, the communication circuitry 138, and/or other components of the destination computing device 106 to cause the destination computing device 106 to perform the method 600. The computer-readable media may be embodied as any type of media capable of being read by the destination computing device 106 including, but not limited to, the memory 134, the data storage device 136, a local memory of a NIC (not shown) of the communication circuitry 138, other memory or data storage devices of the destination computing device 106, portable media readable by a peripheral device of the destination computing device 106, and/or other media.

The method 600 begins in block 602, in which the destination computing device 106 determines whether a communication channel (e.g., the communication channel 104 of FIG. 1) has been established between the destination computing device 106 and the source computing device 102. If so, the method 600 advances to block 604, wherein the destination computing device 106 performs a role reversal capability exchange. As described previously, the role reversal capability exchange may include receiving a request message that includes a role reversal capability indication usable by the destination computing device 106 to determine role reversal capabilities of the source computing device 102, such as whether role reversal is supported by the source computing device 102. As also described previously, the capability exchange may additionally include transmitting a response message from the destination computing device 106 with a role reversal capability indication usable by the source computing device 102 to determine role reversal capabilities of the destination computing device 106, such as whether role reversal is supported by the destination computing device 106.

Upon completion of the role reversal capability exchange, the method 600 advances to block 606, in which the destination computing device 106 determines whether an offload trigger was received. As described previously, the source computing device 102 is configured to transmit the offload trigger to the destination computing device 106. As also described previously, the offload trigger may be a message that includes a role reversal indicator that indicates to the destination computing device 106 whether role reversal is active or not, as well as additional data. As described previously, the additional data may include any data usable by the destination computing device 106 to run/launch the content, such as a URI, an identifier/name an application on the destination computing device 106 to launch the URI, a file name corresponding to a file that includes the content which is stored local to the destination computing device 106, etc.

If the destination computing device 106 determines the offload trigger was not received in block 606, the method 600 advances to block 608, in which the destination computing device 106 determines whether a content stream was received from the source computing device 102. If so, the method 600 advances to block 610, in which the destination computing device 106 displays the content stream received in block 608 before the method 600 returns to block 608 to determine whether the content stream continues to be received; otherwise, the method 600 returns to block 606, in which the destination computing device 106 determines whether the offload trigger was received.

If the destination computing device 106 determines the offload trigger was not received in block 606, the method 600 advances to block 612 in FIG. 7. In block 612, the destination computing device 106 transmits a role reversal acknowledgment, acknowledging receipt of the offload trigger. In block 614, the destination computing device 106 disables, or otherwise pauses, receive functionality of the destination computing device 106. In block 616, the destination computing device 106 enables, or otherwise launches, transmit functionality of the destination computing device 106. In block 618, the destination computing device 106 processes the content stream locally based on the received offload trigger (i.e., the data therefrom usable to retrieve the content). It should be appreciated that, in some embodiments, the content may be stored locally at the destination computing device 106 (i.e., does not require to be streamed from an external location). In block 620, the destination computing device 106 displays the locally processed content. In block 622, the destination computing device 106 transmits the content stream to the receiving device (e.g., the source computing device 102). It should be appreciated that, in some embodiments, the content stream transmitted to the source computing device 102 may be of lower quality/resolution than the quality/resolution of the content displayed local to the destination computing device 106.

In block 624, the destination computing device 106 determines whether to exit role reversal. It should be appreciated that various factors may influence whether the destination computing device 106 exits role reversal, such as the content being streamed having ended, one or more component characteristics (e.g., available memory, battery life, etc.), settings, and/or dynamic capabilities of the source computing device 102 and/or the destination computing device 106 having changed, etc. It should be further appreciated that a message may be received from the source computing device 102 that includes an indication indicating to exit role reversal. In other words, the source computing device 102 or the destination computing device 106 may trigger the role reversal exit. In block 626, the destination computing device 106 transmits a role reversal exit indication via a message that includes an indicator indicating the role reversal exit. In block 628, the destination computing device 106 disables, or otherwise pauses, transmit functionality of the destination computing device 106. In block 630, the destination computing device 106 enables, or otherwise resumes, receive functionality of the destination computing device 106.

EXAMPLES

Illustrative examples of the technologies disclosed herein are provided below. An embodiment of the technologies may include any one or more, and any combination of, the examples described below.

Example 1 includes a source computing device for streaming device role reversal, the source computing device comprising a communication management module to establish a communication channel between the source computing device and a destination computing device; a capability negotiation module to determine whether the source computing device and the destination computing device support role reversal, wherein support of role reversal is indicative that the source computing device and the destination computing device are capable of being switched between receiving and transmitting digital media content over the established communication channel; a role reversal management module to initiate, in response to a determination that both of the source computing device and the destination computing device support role reversal, a role reversal between the source computing device and the destination computing device, wherein to initiate the role reversal comprises to pause transmit functionality of the source computing device and enable the source computing device to receive a content stream from the destination computing device; and a streaming content management module to (i) receive the content stream from the destination computing device and (ii) display the content stream on an output device of the source computing device.

Example 2 includes the subject matter of Example 1, and wherein the streaming content management module is further to (i) determine whether the content is to be transmitted to the destination computing device, (ii) determine, in response to a determination the content is to be transmitted to the destination computing device, whether processing of the content can be offloaded to the destination computing device, and (iii) determine, in response to a determination the processing of the content can be offloaded to the destination computing device, whether to offload the content to the destination computing device, wherein to initiate the role reversal comprises to initiate the role reversal in response to a determination to offload the content to the destination computing device.

Example 3 includes the subject matter of any of Examples 1 and 2, and wherein the streaming content management module is further to transmit an offload trigger to the destination computing device usable by the destination computing device to determine a role reversal has been requested by the source computing device.

Example 4 includes the subject matter of any of Examples 1-3, and wherein the streaming content management module is further to transmit additional data with the offload trigger, wherein the additional data includes at least one of a URI, an identifier of an application on the destination computing device usable by the destination computing device to launch the application, and a file name usable by the destination computing device to open a corresponding file stored on the destination computing device.

Example 5 includes the subject matter of any of Examples 1-4, and, wherein the streaming content management module is further to receive a role reversal acknowledgement from the destination computing device, wherein to initiate the role reversal comprises to initiate the role reversal in response to having received the role reversal acknowledgement.

Example 6 includes the subject matter of any of Examples 1-5, and wherein the role reversal management module is further to (i) receive a role reversal exit indication from the destination computing device and (ii) exit, in response to having received the exit role reversal indication, role reversal.

Example 7 includes the subject matter of any of Examples 1-6, and wherein to exit role reversal comprises to resume transmit functionality of the source computing node and disable the source computing device from receiving the content from the destination computing device.

Example 8 includes the subject matter of any of Examples 1-7, and wherein the role reversal management module is further to (i) determine whether to exit role reversal, (ii)

transmit, in response to a determination to exit role reversal, an exit role reversal indication to the destination computing device, and (ii) exit, in response to having transmitted the exit role reversal indication, role reversal.

Example 9 includes the subject matter of any of Examples 1-8, and wherein to determine whether to exit role reversal comprises to compare one or more capabilities of the source computing device, settings of the source computing device, and characteristics of the source computing device against a corresponding one or more capabilities of the destination computing device, settings of the destination computing device, and characteristics of the destination computing device.

Example 10 includes the subject matter of any of Examples 1-9, and wherein to exit role reversal comprises to resume transmit functionality of the source computing node and disable the source computing device from receiving the content from the destination computing device.

Example 11 includes a method for streaming device role reversal, the method comprising establishing, by a source computing device, a communication channel between the source computing device and a destination computing device; determining, by the source computing device, whether the source computing device and the destination computing device support role reversal, wherein support of role reversal is indicative that the source computing device and the destination computing device are capable of switching between receiving and transmitting digital media content over the established communication channel; initiating, by the source computing device and in response to determining that both of the source computing device and the destination computing device support role reversal, a role reversal between the source computing device and the destination computing device, wherein initiating the role reversal comprises to pause transmit functionality and enable the source computing device to receive a content stream from the destination computing device; receiving, by the source computing device, the content stream from the destination computing device; and displaying, by the source computing device, the content stream on an output device of the source computing device.

Example 12 includes the subject matter of Example 11, and further including determining, by the source computing device, whether the content is to be transmitted to the destination computing device; determining, by the source computing device and in response to a determination the content is to be transmitted to the destination computing device, whether processing of the content can be offloaded to the destination computing device; and determining, by the source computing device and in response to a determination the processing of the content can be offloaded to the destination computing device, whether to offload the content to the destination computing device, wherein initiating the role reversal comprises initiating the role reversal in response to a determination to offload the content to the destination computing device.

Example 13 includes the subject matter of any of Examples 11 and 12, and further including transmitting an offload trigger to the destination computing device usable by the destination computing device to determine a role reversal has been requested by the source computing device.

Example 14 includes the subject matter of any of Examples 11-13, and further including transmitting additional data with the offload trigger, wherein the additional data includes at least one of a URI, an identifier of an application on the destination computing device usable to launch the application, and a file name usable by the destination computing device to open a corresponding file stored on the destination computing device.

Example 15 includes the subject matter of any of Examples 11-14, and further including receiving a role reversal acknowledgement from the destination computing device, wherein initiating the role reversal comprises initiating the role reversal in response to having received the role reversal acknowledgement.

Example 16 includes the subject matter of any of Examples 11-15, and further including receiving, by the source computing device, a role reversal exit indication from the destination computing device; and exiting, by the source computing device and in response to having received the exit role reversal indication, role reversal.

Example 17 includes the subject matter of any of Examples 11-16, and wherein exiting role reversal comprises (i) resuming transmit functionality of the source computing node and (ii) disabling the source computing device from receiving the content from the destination computing device.

Example 18 includes the subject matter of any of Examples 11-17, and further including determining, by the source computing device, whether to exit role reversal; transmitting, by the source computing device and in response to a determination to exit role reversal, an exit role reversal indication to the destination computing device; and exiting, by the source computing device and in response to having transmitted the exit role reversal indication, role reversal.

Example 19 includes the subject matter of any of Examples 11-18, and wherein determining whether to exit role reversal comprises comparing one or more capabilities of the source computing device, settings of the source computing device, and characteristics of the source computing device against a corresponding one or more capabilities of the destination computing device, settings of the destination computing device, and characteristics of the destination computing device.

Example 20 includes the subject matter of any of Examples 11-19, and wherein exiting role reversal comprises (i) resuming transmit functionality of the source computing node and (ii) disabling the source computing device from receiving the content from the destination computing device.

Example 21 includes a source computing device comprising a processor; and a memory having stored therein a plurality of instructions that when executed by the processor cause the source computing device to perform the method of any of Examples 11-20.

Example 22 includes one or more machine readable storage media comprising a plurality of instructions stored thereon that in response to being executed result in a source computing device performing the method of any of Examples 11-20.

Example 23 includes a source computing device comprising means for performing the method of any of Examples 11-20.

Example 24 includes a source computing device for streaming device role reversal, the source computing device comprising means for establishing a communication channel between the source computing device and a destination computing device; means for determining whether the source computing device and the destination computing device support role reversal, wherein support of role reversal is indicative that the source computing device and the destination computing device are capable of switching between receiving and transmitting digital media content over the established communication channel; means for initiating, in response to determining that both of the source computing device and the destination computing device support role reversal, a role reversal between the source computing device and the destination computing device, wherein initiating the role reversal comprises to pause transmit functionality and enable the source computing device to receive a content stream from the destination computing device; means for receiving the content stream from the destination computing device; and means for displaying the content stream on an output device of the source computing device.

Example 25 includes the subject matter of Example 24, and further including means for determining whether the content is to be transmitted to the destination computing device; means for determining, in response to a determination the content is to be transmitted to the destination computing device, whether processing of the content can be offloaded to the destination computing device; and means for determining, in response to a determination the processing of the content can be offloaded to the destination computing device, whether to offload the content to the destination computing device, wherein the means for initiating the role reversal comprises means for initiating the role reversal in response to a determination to offload the content to the destination computing device.

Example 26 includes the subject matter of any of Examples 24 and 25, and further including means for transmitting an offload trigger to the destination computing device usable by the destination computing device to determine a role reversal has been requested by the source computing device.

Example 27 includes the subject matter of any of Examples 24-26, and further including means for transmitting additional data with the offload trigger, wherein the additional data includes at least one of a URI, an identifier of an application on the destination computing device usable to launch the application, and a file name usable by the destination computing device to open a corresponding file stored on the destination computing device.

Example 28 includes the subject matter of any of Examples 24-27, and further including means for receiving a role reversal acknowledgement from the destination computing device, wherein initiating the role reversal comprises initiating the role reversal in response to having received the role reversal acknowledgement.

Example 29 includes the subject matter of any of Examples 24-28, and further including means for receiving a role reversal exit indication from the destination computing device; and means for exiting, in response to having received the exit role reversal indication, role reversal.

Example 30 includes the subject matter of any of Examples 24-29, and wherein the means for exiting role reversal comprises means for (i) resuming transmit functionality of the source computing node and (ii) disabling the source computing device from receiving the content from the destination computing device.

Example 31 includes the subject matter of any of Examples 24-30, and further including means for determining whether to exit role reversal; means for transmitting, in response to a determination to exit role reversal, an exit role reversal indication to the destination computing device; and means for exiting, in response to having transmitted the exit role reversal indication, role reversal.

Example 32 includes the subject matter of any of Examples 24-31, and wherein the means for determining whether to exit role reversal comprises means for means for comparing one or more capabilities of the source computing device, settings of the source computing device, and characteristics of the source computing device against a corresponding one or more capabilities of the destination computing device, settings of the destination computing device, and characteristics of the destination computing device.

Example 33 includes the subject matter of any of Examples 24-32, and wherein the means for exiting role reversal comprises means for (i) resuming transmit functionality of the source computing node and (ii) disabling the source computing device from receiving the content from the destination computing device.

What is claimed is:

1. A first device comprising:
   communication circuitry to transmit first data to a second device via a communication channel, the first data associated with media;
   machine-readable instructions; and
   at least one processor circuit to be programmed based on the machine-readable instructions to:
     cause the communication circuitry to transmit second data associated with a role switch to the second device, the second data to include information usable by the second device to access the media from a source different from the first device;
     cause the communication circuitry to stop transmission of the first data to the second device; and
     access third data from the second device via the communication circuitry, the third data associated with the media.

2. The first device of claim 1, wherein one or more of the at least one processor circuit is to:
   evaluate battery life of at least one of the first device or the second device; and
   initiate the role switch based on the evaluation.

3. The first device of claim 1, wherein the role switch is a first role switch, and one or more of the at least one processor circuit is to initiate a second role switch between the first device and the second device based on battery life of at least one of the first device or the second device.

4. The first device of claim 3, wherein one or more of the at least one processor circuit is to cause the communication circuitry to stop reception of the third data from the second device after initiation of the second role switch.

5. The first device of claim 1, wherein the information usable by the second device to access the media includes a first identifier of the media and a second identifier of an application to be used by the second device to access the media based on the first identifier.

6. The first device of claim 1, wherein the communication channel is a Bluetooth communication channel.

7. The first device of claim 1, wherein the first device is a wearable device.

8. A first device comprising:
   communication circuitry to receive first data from a second device via a communication channel, the first data associated with media;
   machine-readable instructions; and
   at least one processor circuit to be programmed based on the machine-readable instructions to:
     access second data from the first device, the second data associated with a role switch, the second data to include information usable by the first device to access the media from a source different from the second device;
     access the media based on the information included in the second data; and cause the communication circuitry to transmit third data to the second device, the third data associated with the media.

9. The first device of claim 8, wherein the communication channel is a Bluetooth communication channel.

10. The first device of claim 8, wherein the first device is a wearable device.

11. The first device of claim 8, wherein one or more of the at least one processor circuit is to determine that the first device and the second device are to perform the role switch based on a trigger from the second device.

12. The first device of claim 8, wherein the role switch is a first role switch, and one or more of the at least one processor circuit is to initiate a second role switch between the first device and the second device based on battery life of at least one of the first device or the second device.

13. The first device of claim 12, wherein one or more of the at least one processor circuit is to cause the communication circuitry to transmit fourth data to the second device, the fourth data associated with the second role switch.

14. The first device of claim 8, wherein the information usable by the first device to access the media includes a first identifier of the media and a second identifier of an application to be used by the first device to access the media based on the first identifier.

15. A system comprising:
a first device; and
a second device;
the first device is to:
  transmit first data associated with media to the second device;
  determine that the first device and the second device are to perform a role switch;
  transmit second data associated with the role switch to the second device, the second data to include information usable by the second device to access the media from a source different from the first device;
  stop transmission of the first data to the second device; and
  access third data associated with the media from the second device; and
the second device is to:
  access the first data associated with the media from the first device;
  access the second data associated with the role switch from the first device;
  access the media based on the information included in the second data; and
  transmit the third data associated with the media to the first device.

16. The system of claim 15, wherein the first device and the second device are to communicate via a Bluetooth communication channel.

17. The system of claim 15, wherein the first device is a first wearable device and the second device is a second wearable device.

18. The system of claim 15, wherein the first device is to:
evaluate battery life of at least one of the first device or the second device; and
initiate the role switch based on the evaluation.

19. The system of claim 15, wherein the role switch is a first role switch, and the second device is to initiate a second role switch between the first device and the second device based on battery life of at least one of the first device or the second device.

20. The system of claim 15, wherein the information usable by the second device to access the media includes a first identifier of the media and a second identifier of an application to be used by the second device to access the media based on the first identifier.

* * * * *